US006243109B1

(12) United States Patent
Ishinaga et al.

(10) Patent No.: US 6,243,109 B1
(45) Date of Patent: Jun. 5, 2001

(54) PRINT HEAD WITH DRIVING, TRANSMISSION AND CONTROL DEVICES ON SINGLE SUBSTRATE

(75) Inventors: Hiroyuki Ishinaga, Tokyo; Junji Shimoda, Chigasaki; Fumio Murooka, Atsugi; Tatsuo Furukawa, Atsugi; Hiroyuki Maru, Atsugi; Masaaki Izumida; Yoshinori Misumi, both of Kawasaki, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/996,058

(22) Filed: Dec. 22, 1997

Related U.S. Application Data

(63) Continuation of application No. 08/265,808, filed on Jun. 27, 1994, now abandoned.

(30) Foreign Application Priority Data

Jun. 30, 1993 (JP) .................................................... 5-162786

(51) Int. Cl.[7] .................................................... H04N 1/034

(52) U.S. Cl. ..................................... 347/3; 347/5; 347/86

(58) Field of Search ................................ 347/3, 5, 9, 14, 347/49, 50, 86, 87

(56) References Cited

U.S. PATENT DOCUMENTS

| | | | |
|---|---|---|---|
| 4,313,124 | 1/1982 | Hara | 347/57 |
| 4,345,262 | 8/1982 | Shirato et al. | 347/10 |
| 4,459,600 | 7/1984 | Sato et al. | 347/47 |
| 4,463,359 | 7/1984 | Ayata et al. | 347/56 |
| 4,558,333 | 12/1985 | Sugitani et al. | 347/65 |
| 4,608,577 | 8/1986 | Hori | 347/66 |
| 4,723,129 | 2/1988 | Endo et al. | 347/56 |
| 4,740,796 | 4/1988 | Endo et al. | 347/56 |
| 4,788,563 | 11/1988 | Omo et al. | 347/14 |
| 5,006,864 | 4/1991 | Ayata et al. | 346/33 R |
| 5,030,971 | 7/1991 | Drake et al. | 347/57 |
| 5,265,315 | 11/1993 | Hosington et al. | 29/25.35 |
| 5,666,140 | 9/1997 | Mitani et al. | 347/12 |

FOREIGN PATENT DOCUMENTS

| | | |
|---|---|---|
| 0 353 925 | 2/1990 | (EP) . |
| 0 394 910 | 10/1990 | (EP) . |
| 0 452 663 | 10/1991 | (EP) . |
| 54-56847 | 5/1979 | (JP) . |
| 57-125060 | 8/1982 | (JP) . |
| 59-123670 | 7/1984 | (JP) . |
| 59-138461 | 8/1984 | (JP) . |
| 60-71260 | 4/1985 | (JP) . |
| 61-27261 | 2/1986 | (JP) . |
| 63-156756 | 10/1988 | (JP) . |
| 2-134065 | 5/1990 | (JP) . |
| 4-135779 | 5/1992 | (JP) . |
| 6-134993 | 5/1994 | (JP) . |

*Primary Examiner*—John Barlow
*Assistant Examiner*—Craig A. Hallacher
(74) *Attorney, Agent, or Firm*—Fitzpatrick, Cella, Harper & Scinto

(57) ABSTRACT

In a print head of this invention, electricity-to-heat converters and a driver circuit for driving these electricity-to-heat converters in accordance with print data are formed on a single board. The board further includes an input/output interface circuit for receiving print data from an external apparatus, a CPU for controlling a printer apparatus, a ROM, a RAM, an A/D converter, a D/A converter, a timer, and the like, and also includes an external element driver for driving a mechanism portion of the printer apparatus.

99 Claims, 9 Drawing Sheets

PRINT HEAD WITH DRIVING, TRANSMISSION AND CONTROL DEVICES ON SINGLE SUBSTRATE

This application is a continuation of application Ser. No. 08/265,808 filed Jun. 27, 1994, abandoned.

BACKGROUND OF THE INVENTION

1. Field of the Invention

The present invention relates to a print head for printing an image on a print medium when it is mounted on and driven by a printer apparatus main body, and a printer apparatus using the same.

2. Description of the Related Art

FIGS. 2 to 4 show the arrangements of conventional print heads. In a print head shown in FIG. 2, electricity-to-heat converters 2 such as heating resistors, terminals 17*a,* and wiring lines 16 for connecting the terminals 17*a* and the electricity-to-heat converters 2 are arranged on a heater board 1*a*. In a print head shown in FIG. 3, a diode matrix 18 is arranged between terminals 17*b* and wiring lines 16, so that driving signals from an external circuit can be received via a smaller number of terminals 17*b* than the number of terminals 17*a* in FIG. 2. In the case of a print head shown in FIG. 4, a driver 3 is arranged in a heater board 1*c,* and the driver 3 and electricity-to-heat converters 2 are directly connected by wiring lines 16. Print data for driving the electricity-to-heat converters 2 to generate heat are input from terminals 17*c* to shift registers 20. In this case, the number of terminals 17*c* can be smaller than the numbers of terminals 17*a* and 17*b* on the above-mentioned heater boards 1*a* and 1*b*.

FIGS. 5 and 6 show the arrangements of printer apparatuses which adopt such print heads.

FIG. 5 is a block diagram showing a connection between the arrangement of a printer apparatus adopting the print head shown in FIG. 2 or 3, and a host computer 30.

Referring to FIG. 5, the host computer 30 supplies print information to an input/output interface (I/F) 8 in a printer apparatus 21. The print information is supplied to a microprocessor (MPU) 28, and is converted by the MPU 28 into predetermined print information under the control of a program stored in a memory (not shown). The converted print information is supplied to the heater board 1*a* or 1*b* via a driver 27. The driver 27 drives the electricity-to-heat converters 2 of a head 22 to discharge ink droplets, thereby printing an image on a print medium. The print head 22 comprises, e.g., a temperature control heater 24 for increasing the temperature of the print head 22, a temperature sensor 25 for detecting the head temperature, and the like in addition to the heater board 1*a* or 1*b,* and is controlled to improve print quality using the MPU 28 and the driver 27.

FIG. 6 is a block diagram showing a connection between the arrangement of a printer apparatus which adopts a print head 22 shown in FIG. 4 and the host computer 30. In the print head 22 shown in FIG. 6, the heater board 1*c* builds in the driver 27 in addition to the electricity-to-heat converters 2. A power supply 26 is connected to the driver 27, and print data is supplied to the electricity-to-heat converters 2 via the driver 27.

The above-mentioned conventional arrangements suffer the following problems to be solved.

The print head shown in FIG. 2 requires the terminals 17*a* and the wiring lines in correspondence with the number of electricity-to-heat converters. Therefore, the board size of the heater board 1*a* increases, and the wiring lines in the printer apparatus 21 increase in number and are complicated, resulting in an increase in cost.

In the case of the print head shown in FIG. 3, when the diode matrix 18 (m×p) is used, the number of electrical contacts of the terminals 17*b* and the number of wiring lines can be (m+p) since the number n of the electricity-to-heat converters is given by n=m×p. However, in this case, since a matrix driving method is adopted, the degree of freedom in a method of driving nozzles is lowered.

In the case of the print head shown in FIG. 4, the number of electrical contacts of the terminals 17*c* and the number of wiring lines are smaller than those of the above-mentioned print heads. However, since this head adopts a serial data transfer method using the shift registers 20, print data must be temporarily converted into serial data in the printer apparatus 21. Therefore, the loads on software and hardware increase, resulting in a decrease in transfer rate of print data and an increase in hardware cost.

Furthermore, in the conventional printer apparatus as shown in FIGS. 5 and 6, it is required to provide an interface 8 for inputting information transferred from the host computer 30, a microprocessor 28 for processing the information, and a signal path (such as a cable) for transferring a signal to a driving head in the printer apparatus. Furthermore, another signal path for transferring the information to the microprocessor 28 to feedback the temperature information detected by the temperature sensor 25 of the print head is also required. Thus, problems arise in complication in the circuit constitution, increase in the circuit scale of the entire apparatus, and increase in cost due to the increase of the number of assembling steps.

SUMMARY OF THE INVENTION

The present invention has been made in consideration of the above-mentioned prior arts, and has as its object to provide a print head which can reduce the circuit scale of the entire apparatus and can reduce cost and shorten the data processing time since it mounts various circuits on a board of the print head, and a printer apparatus using the same.

It is another object of the present invention to provide a print head which can greatly reduce cost of the entire printer apparatus since it builds in most of electrical circuits of the printer apparatus in a board of the print head, and a printer apparatus using the same.

It is still another object of the present invention to provide a print head which can achieve high-speed data processing since it mounts a control circuit on a print head board, so that the control circuit has a memory arrangement suited for the arrangement of the print head, and a printer apparatus using the same.

It is still another object of the present invention to provide a print head which can make the entire printer apparatus compact.

It is still another object of the present invention to provide a print head which can achieve multi-functions since temperature input/output devices, light or magnetism.pressure input/output devices, driving elements for an external motor and the head, and the like are formed in a single process in the manufacture of a board of the print head, and a printer apparatus using the same.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principle of the invention.

DESCRIPTION OF THE PREFERRED EMBODIMENTS

The preferred embodiments of the present invention will be described in detail hereinafter with reference to the accompanying drawings.

Figure 1:
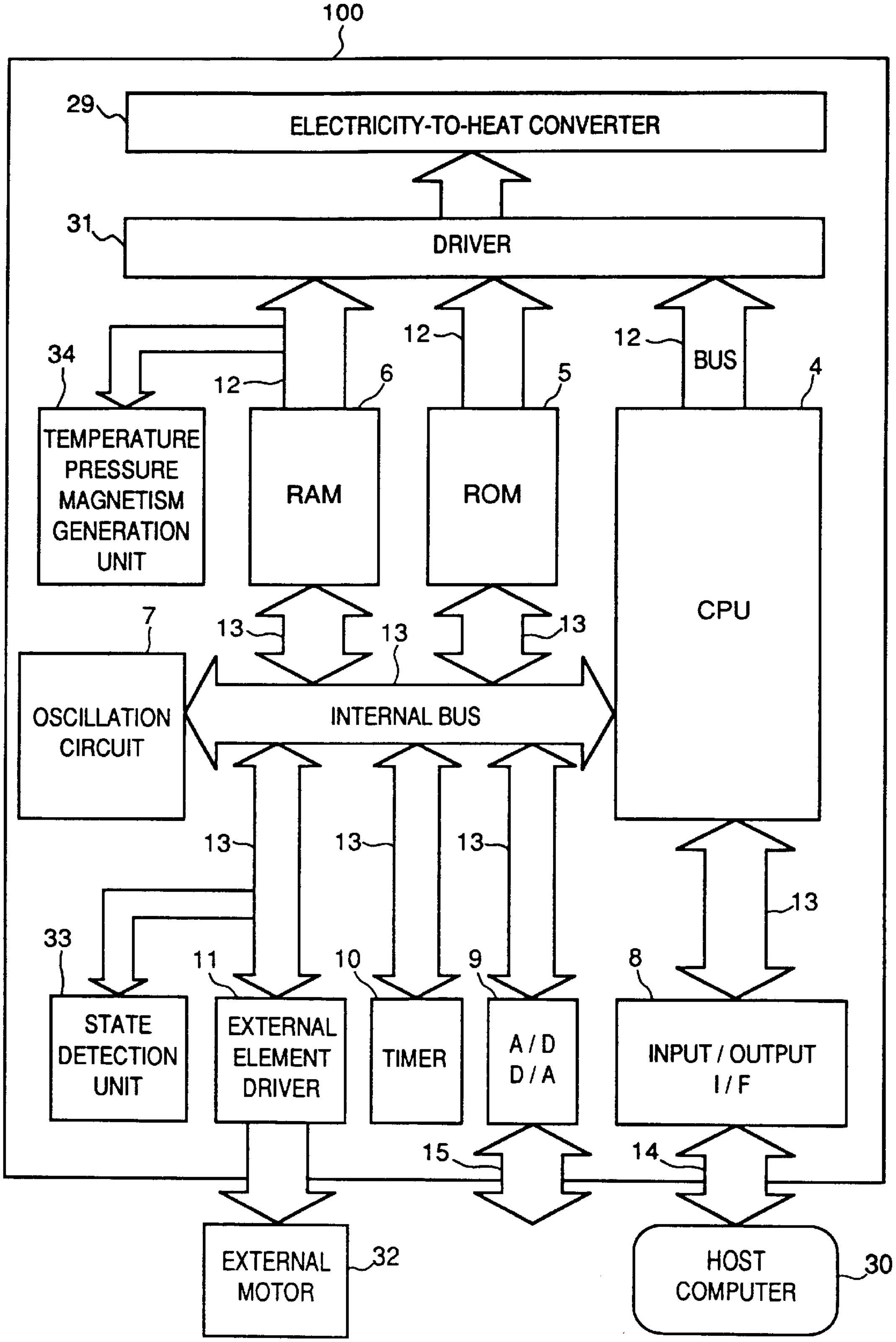
FIG. 1 is a block diagram showing the arrangement of a heater board used in a printer apparatus according to an embodiment of the present invention.
Figure 2:
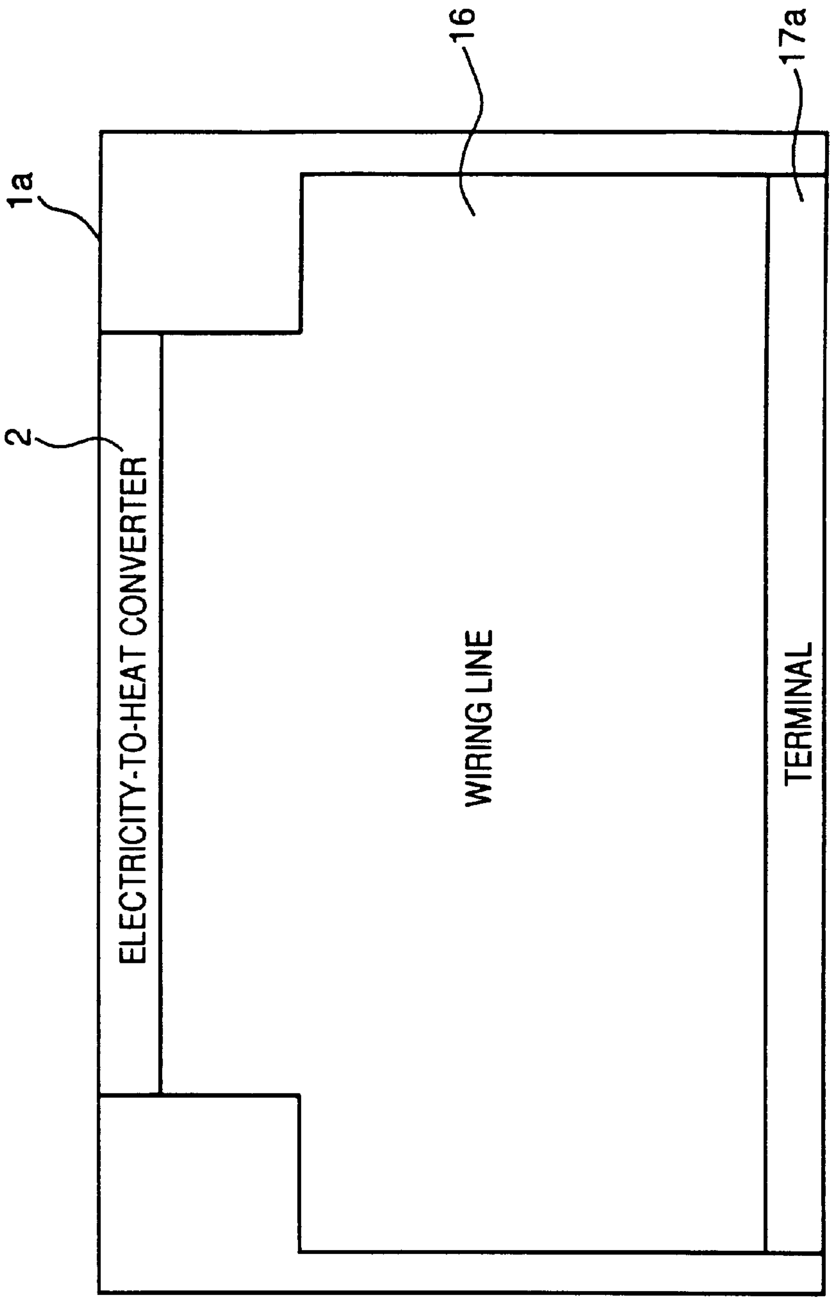
FIG. 2 a plan view showing the arrangement of a conventional heater board.
Figure 3:
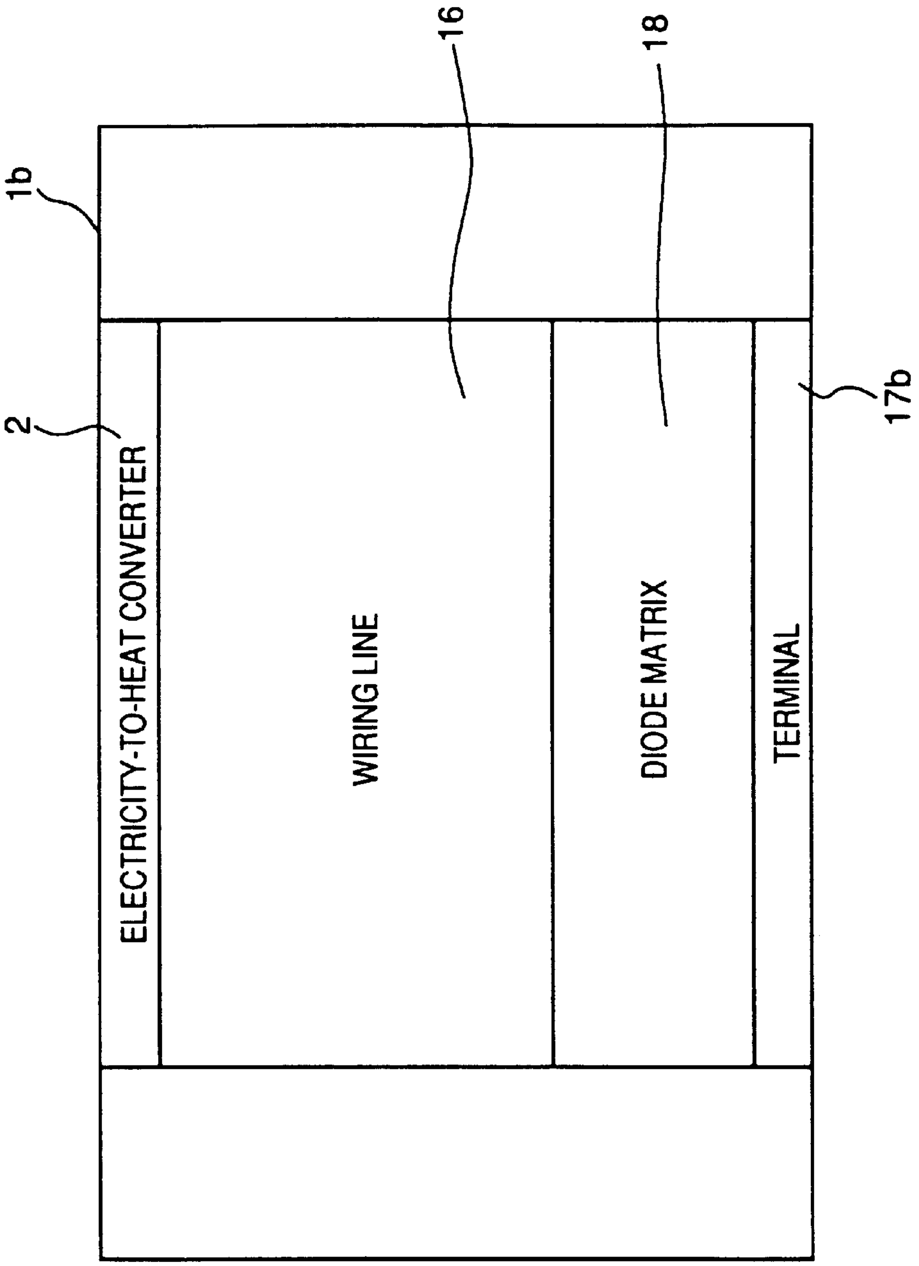
FIG. 3 is a plan view showing the arrangement of another conventional heater board.
Figure 4:
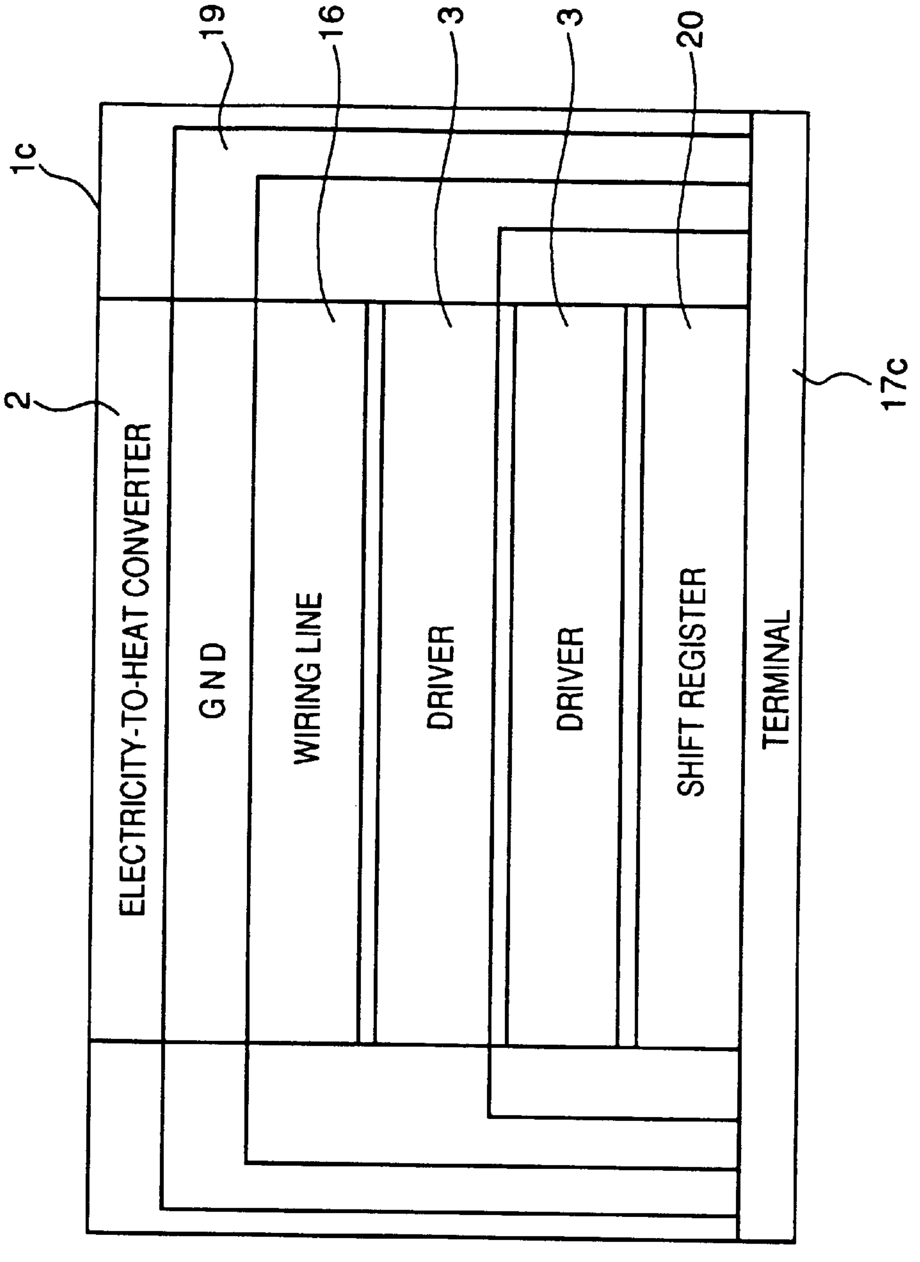
FIG. 4 is a plan view showing the arrangement of still another conventional heater board.

FIG. 1 is a block diagram showing the arrangement of a heater board 100 of a print head according to this embodiment. In this embodiment, the print head is driven by energizing heating resistors (electricity-to-heat converters 29) arranged in correspondence with nozzles. The heating resistors are arranged in the corresponding nozzles. An ink undergoes film boiling based on heat generated by the resistors, and the nozzles (print elements) discharge ink droplets, thus achieving a print operation.

The heater board 100 of this embodiment builds in most of electrical circuits required in a normal printer apparatus. Print data and print control data from a host computer 30 are input to the head via a transmission line 14 and an input/output interface 8. The print data input from the host computer 30 is fetched by a microprocessor unit (CPU) 4 via an internal bus 13. Note that the transmission line 14 generally complies with a Centronics interface, RS232C, or the like, while the internal bus 13 includes a data bus, an address bus, and a control bus, and transmits a plurality of parallel signals (e.g., 4-bit signals, 8-bit signals, 16-bit signals, or the like) in units of bits of arithmetic processing of the CPU 4.

The fetched print data may be compressed. Since image data has a large data volume and imposes heavy loads on the memory for storing the data and the transfer time of the data, data compression is normally performed. Compressed data is transferred to the heater board 100 of this embodiment, and is expanded to original image data by the CPU 4 of the heater board 100, thus saving the data transfer time and the memory capacity of the apparatus main body.

The print data fetched by the CPU 4 includes, e.g., image data, image control data, image quality correction data, and the like, and is processed using a ROM 5 and a RAM 6, which are built in the heater board 100 and are connected via corresponding internal buses 13. The ROM 5 stores a control program for the CPU 4, and also stores predetermined image data as patterns. The ROM 5 may comprise a mask ROM, $E^2$PROM, one-time ROM, or the like. The RAM 6 is used as an area for data supplied from the host computer 30 and a work area for data processing and arithmetic processing, and stores image data, print data subjected to image processing, and the like. These data are supplied to electricity-to-heat converters 29 via a driver 31, and the electricity-to-heat converters 29 are selectively driven to generate heat in accordance with the print data, thereby discharging ink droplets.

Depending on situations, print data is supplied from the CPU 4 to the driver 31 via an internal bus 12, or is directly supplied from the ROM 5 or the RAM 6 to the driver 31. When a large volume of data is to be supplied to the driver 31 at high speed, a method (direct memory access: DMA) for directly supplying data from the ROM 5 or the RAM 6 to the driver 31 is adopted. Furthermore, each of the ROM 5 and the RAM 6 has an n×x memory arrangement in correspondence with the number n of nozzles, and each corresponding internal bus 12 has n lines, so that a memory (RAM 6) directly supplies data to the driver 31 or the electricity-to-heat converters 29, thus realizing high-speed data transfer.

The heater board 100 is provided with a clock oscillation circuit 7, and the CPU 4 operates in accordance with a clock signal output from the oscillation circuit 7. Reference numeral 10 denotes a timer circuit for measuring a predetermined period of time in accordance with an instruction from the CPU 4, and informs the lapse of the time to the CPU 4. Thus, the CPU 4 can control the energization time of the electricity-to-heat converters 29 and a motor 32. Reference numeral 11 denotes an external element driver for driving the external motor 32, a solenoid, and an external head (not shown). Reference numeral 9 denotes an A/D & D/A converter unit having analog circuits such as an A/D converter, a D/A converter, an operational amplifier, and the like. The converter unit 9 can convert an analog signal input from an external circuit via input/output terminals 15 into a digital signal, and can output the digital signal onto a corresponding internal bus 13. The converter unit 9 can also convert a digital signal from the internal bus 13 into an analog signal, and can output the analog signal. Also, when a light-emitting element, a light-receiving element, a magnetic sensor, (none of them are shown) and the like are arranged to detect the print position (scanning position of a carriage), synchronization with the print timing can be achieved. Furthermore, when a temperature.pressure.magnetism generation unit 34, a status detection unit 33 (e.g., a temperature detection element or a pressure detection element), and the like are arranged, feedback control can be realized by detecting the head temperature.

Also, when an electromagnetic wave detection element (not shown) is arranged, a print signal and a control signal can be input by means of radio waves. When a heat generation element (a heater, light-emitting element, laser or the like; or a generator of an electromagnetic wave such as a microwave) is arranged to thermally evaporate an ink discharged onto a print paper sheet, image quality can be improved.

Figure 7:
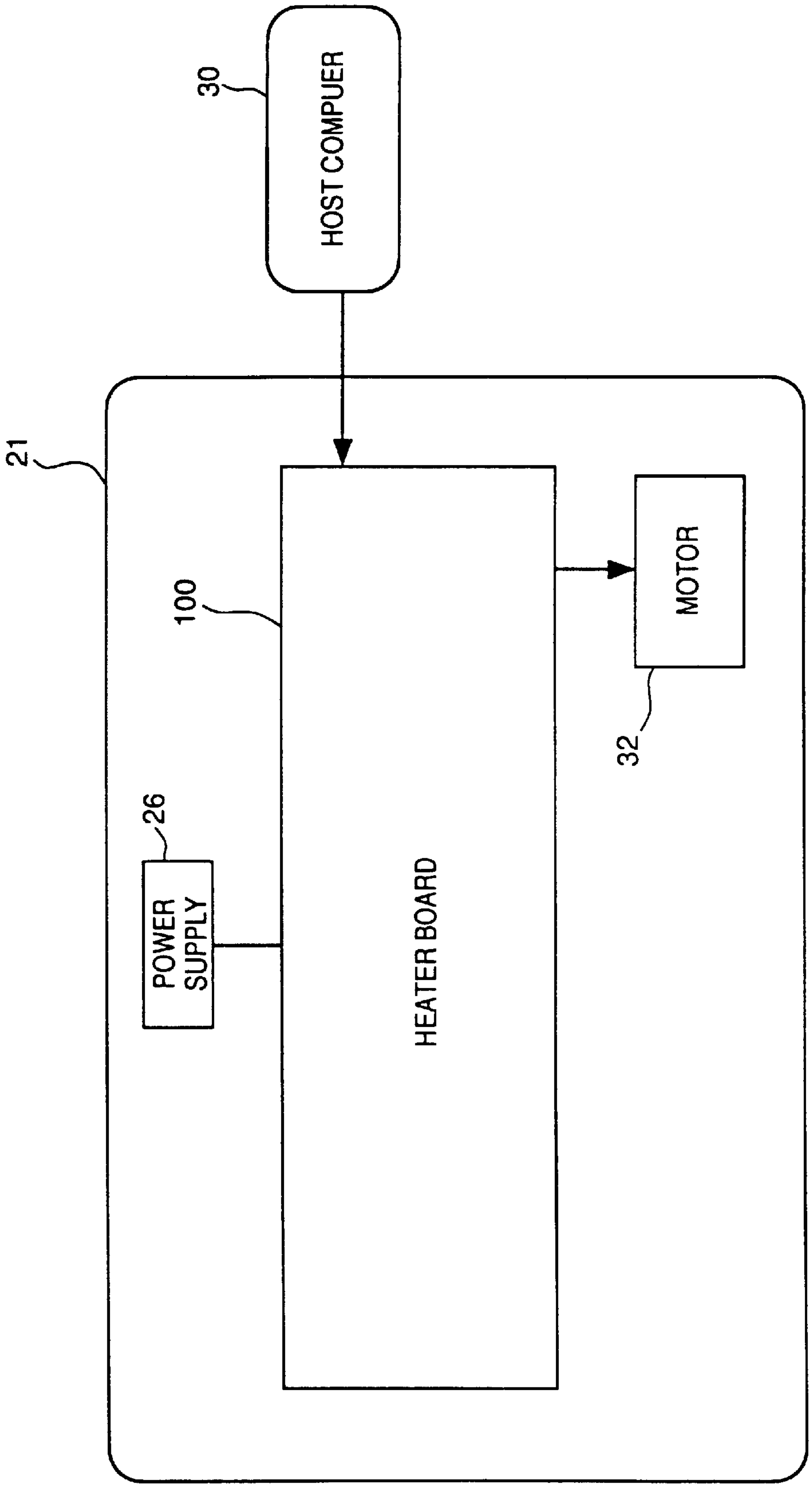
FIG. 7 is a block diagram showing the arrangement of a printer apparatus using the heater board according to the embodiment shown in FIG. 1.

FIG. 7 shows the arrangement of the printer apparatus as a whole, and the same reference numerals in FIG. 7 denote the same parts as in FIG. 1.

Figure 5:
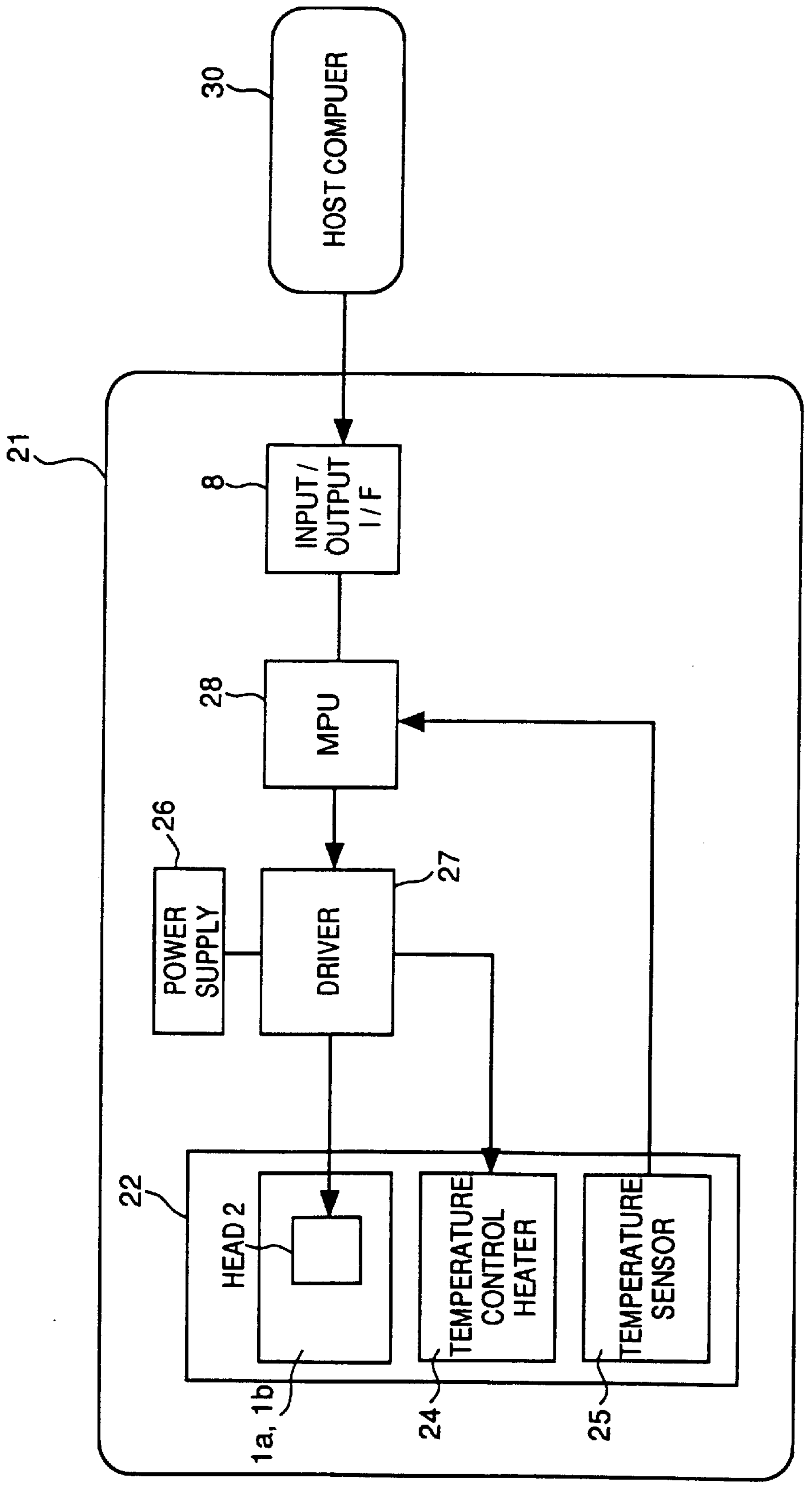
FIG. 5 is a block diagram showing the arrangement of a printer apparatus using the conventional heater board.
Figure 6:
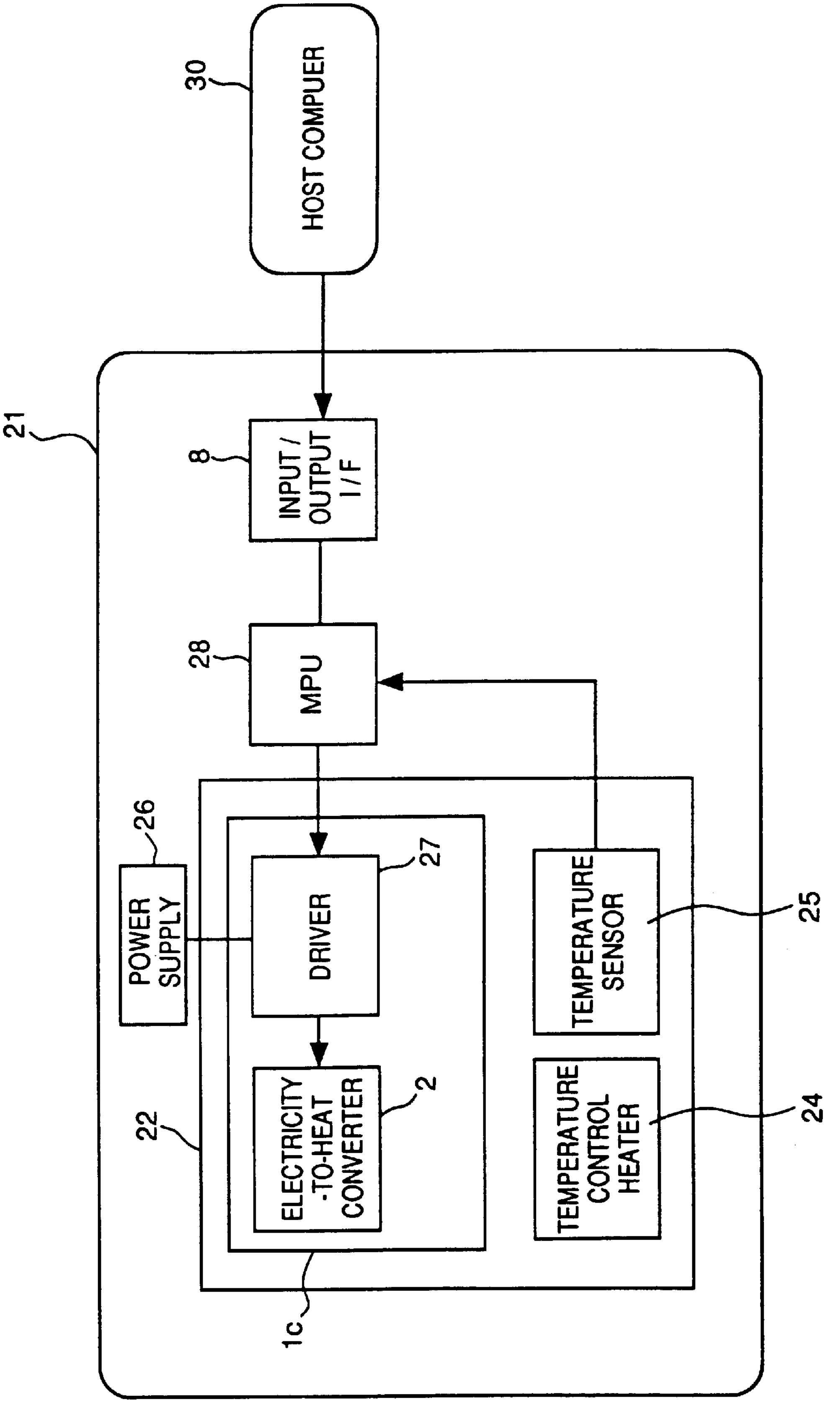
FIG. 6 is a block diagram showing the arrangement of a printer apparatus using the conventional heater board.

Upon comparison between the arrangement of a printer apparatus 21 of this embodiment and the conventional arrangement shown in FIG. 5 or 6, the arrangement of the printer apparatus main body is simplified in this embodiment, and cost can be greatly reduced even if an increase in cost required for realizing the arrangement of the heater board 100 of this embodiment is taken into consideration. Furthermore, since this heater board 100 comprises the interface 8 with the host computer 30, the electricity-to-heat converters 29, the driver 31 for the converters 29, the timer circuit 10, the A/D & D/A converter unit 9, the driver for the external motor 32, and the like, the loads on software and hardware upon data transfer among units can be eliminated, thus achieving reduction of the circuit scale and a decrease in development cost.

Figure 8:
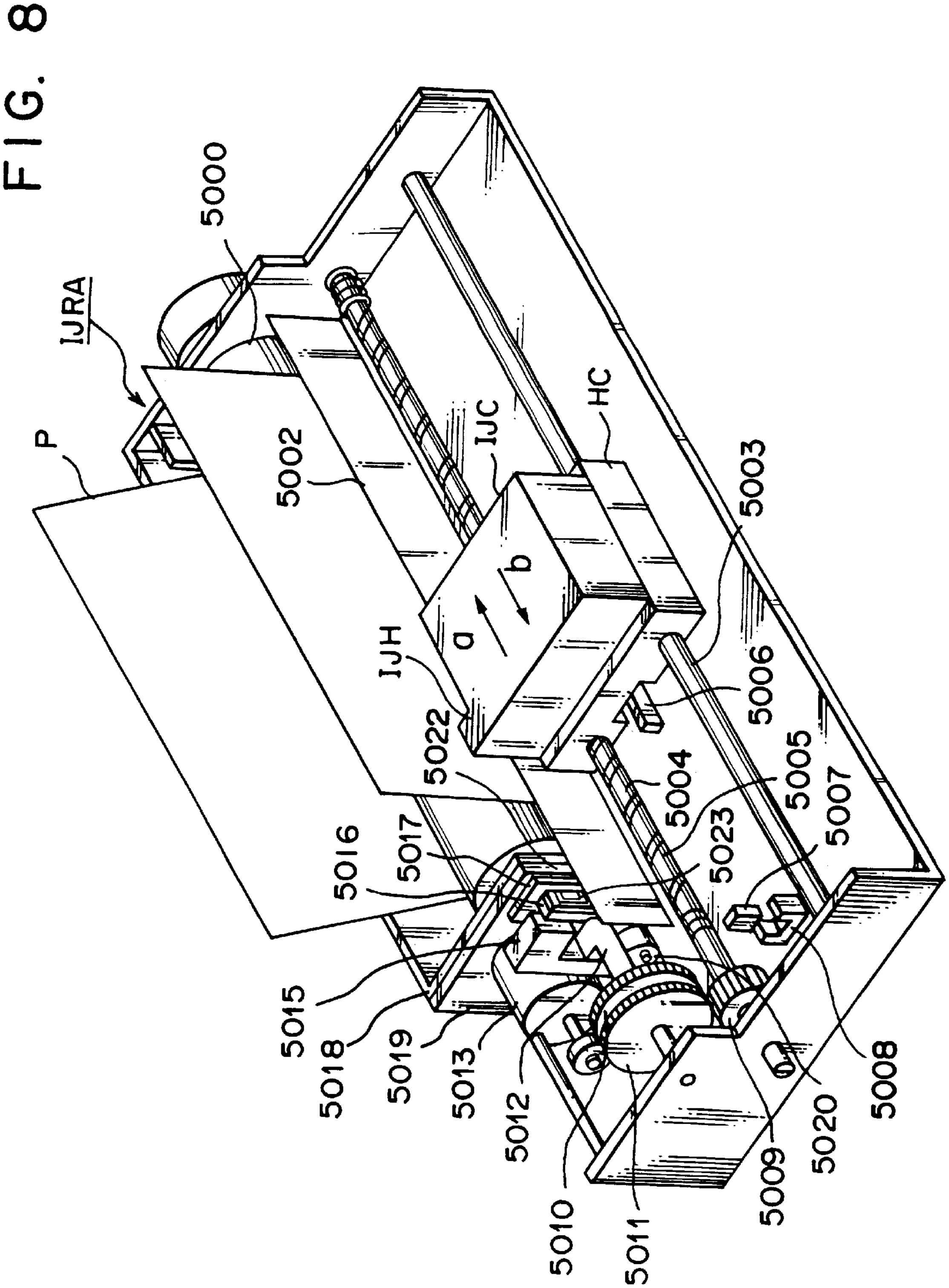
FIG. 8 is a schematic perspective view of an inkjet recording apparatus IJRA to which the present invention can be applied.

FIG. 8 is a schematic perspective view of an ink-jet printer apparatus IJRA to which the present invention can be applied. Referring to FIG. 8, a carriage HC is engaged with a spiral groove 5004 of a lead screw 5005, which is rotated via driving force transmission gears 5011 and 5009 in synchronism with the reverse/forward rotation of a driving motor 5013. The carriage HC has a pin (not shown), and is reciprocally moved in the directions of arrows a and b along a shaft 5003 in FIG. 8. The carriage HC carries an ink-jet head IJH and an ink-jet cartridge IJC. The heater board 100 of the ink-jet head IJH comprises the above-mentioned circuit shown in FIG. 1. Reference numeral 5002 denotes a pressing plate for pressing a paper sheet against a platen 5000 across the moving direction of the carriage HC. Reference numerals 5007 and 5008 denote photocouplers which constitute a home position detection unit for detecting the presence of a lever 5006 of the carriage HC, and, for example, switching the rotational direction of the motor 5013. Reference numeral 5016 denotes a member for supporting a cap member 5022 for capping the front surface of the print head IJH; and 5015, a suction unit for drawing the interior of this cap by suction, and performing suction recovery of the print head IJH via an intra-cap opening 5023. Reference numeral 5017 denotes a cleaning blade; and 5019, a member for supporting the blade 5017 to be movable in the back-and-forth direction. These members are supported on a main body support plate 5018. The shape of the blade 5017 is not limited to one illustrated in FIG. 8, and a known cleaning blade can be applied to this embodiment, needless to say. Reference numeral 5012 denotes a lever for initiating a suction process of the suction recovery. The lever 5012 is moved upon movement of a cam 5020 which is engaged with the carriage HC, and its movement control is performed by known transmission means (e.g., clutch switching 5010) on the basis of the driving force from the driving motor 5013.

These capping, cleaning, and suction recovery processes are designed to be executed at their corresponding positions upon operation of the lead screw 5005 when the carriage HC reaches an area at the home position side. However, the present invention is not limited to this as long as required operations are performed at known timings.

<Description of Control Arrangement>

Figure 9:
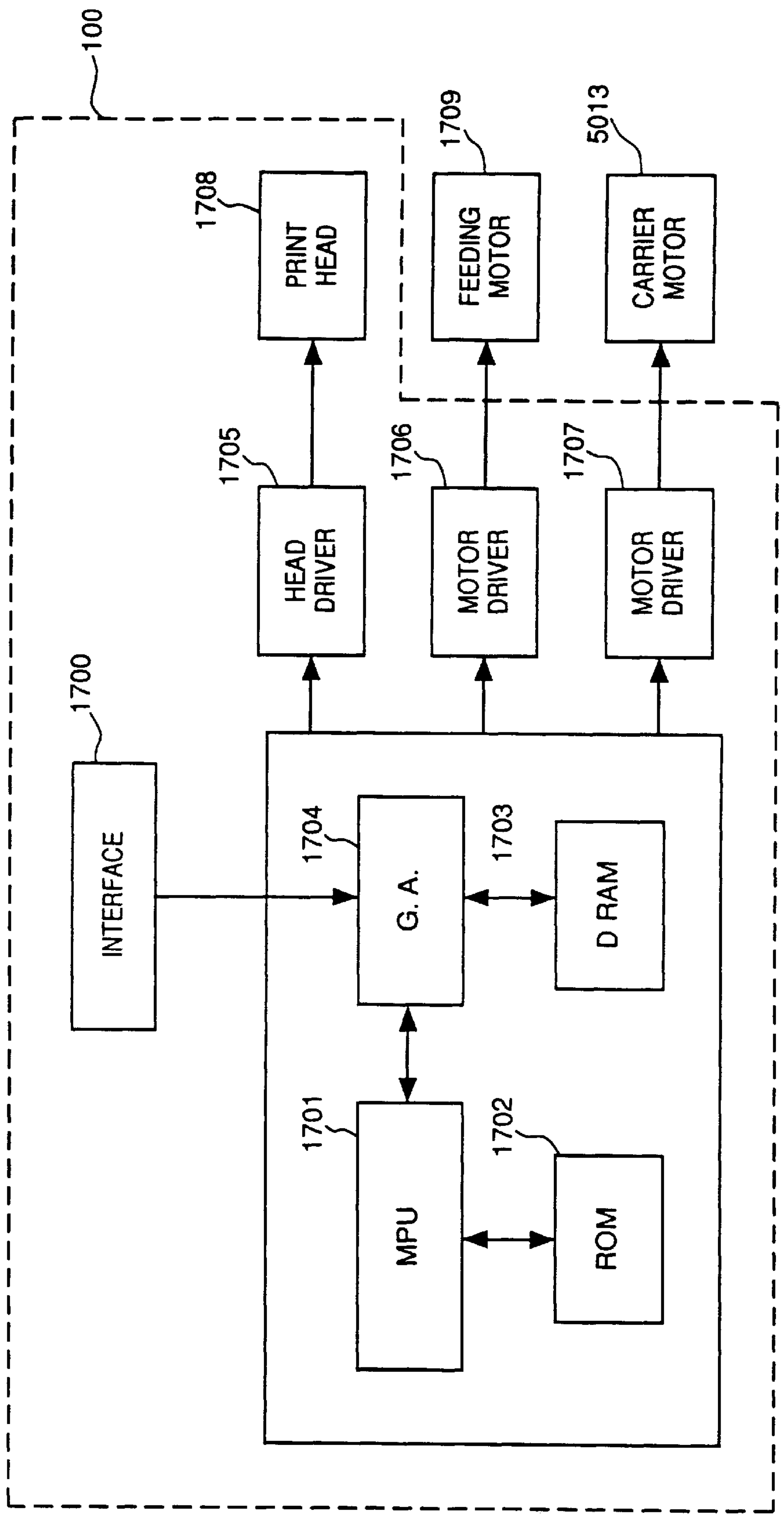
FIG. 9 is a schematic block diagram showing the arrangement of the ink-jet recording apparatus shown in FIG. 8.

The control arrangement for executing print control of the above-mentioned apparatus will be described below with reference to the block diagram shown in FIG. 9. In FIG. 9, the circuit portion of the heater board 100 is surrounded by a dotted line. Referring to FIG. 9 showing the control circuit, reference numeral 1700 denotes an interface for inputting a print signal; 1701, an MPU; 1702, a program ROM for storing a control program to be executed by the MPU 1701; and 1703, a dynamic RAM for storing various data (the print signal, print data to be supplied to a print head 1708, and the like). Reference numeral 1704 denotes a gate array for controlling supply of print data to the print head 1708, and also performing data transfer control among the interface 1700, the MPU 1701, and the RAM 1703. Reference numeral 5013 denotes a carrier motor for conveying the print head 1708; and 1709, a feeding motor for feeding a recording paper sheet. Reference numeral 1705 denotes a head driver for driving the head 1708; and 1706 and 1707, motor drivers for respectively driving the feeding motor 1709 and the carrier motor 5013.

The operation of the control arrangement will be described below. When a recording signal is input to the interface 1700, the recording signal is converted into print data for a print operation between the gate array 1704 and the MPU 1701. The motor drivers 1706 and 1707 are driven, and the print head 1708 is driven in accordance with print data supplied to the head driver 1705, thereby performing a print operation.

The constituting elements of the present invention can be assembled in the above-mentioned control arrangement of the ink-jet printer. The present invention is not limited to the printer apparatus of this embodiment, but can be applied to other printer apparatuses such as a thermal printer and printers having other arrangements.

The present invention is especially advantageous to be applied to an ink-jet print head and printer apparatus, that perform printing by utilizing thermal energy to form flying fluid droplets, among various ink-jet printer systems, so as to obtain excellent printed matter.

As for the typical structure and principle, it is preferable that the basic structure disclosed in, for example, U.S. Pat. Nos. 4,723,129 or 4,740,796 is employed. The aforesaid method can be adapted to both a so-called on-demand type apparatus and a continuous type apparatus. In particular, a satisfactory effect can be obtained when the on-demand type apparatus is employed because of the structure arranged in such a manner that one or more drive signals, which rapidly raise the temperature of an electricity-to-heat converter disposed to face a sheet or a fluid passage which holds the fluid (ink) to a level higher than levels at which nucleate boiling takes place are applied to the electricity-to-heat converter so as to generate heat energy in the electricity-to-heat converter and to cause the heat effecting surface of the print head to effect film boiling so that bubbles can be formed in the fluid (ink) to correspond to the one or more drive signals. The enlargement/contraction of the bubble will cause the fluid (ink) to be discharged through a discharging opening so that one or more droplets are formed. If a pulse shape drive signal is employed, the bubble can be enlarged/contracted immediately and properly, causing a further preferred effect to be obtained because the fluid (ink) can be discharged while revealing excellent responsiveness.

It is preferable that a pulse drive signal disclosed in U.S. Pat. Nos. 4,463,359 or 4,345,262 is employed. If conditions disclosed in U.S. Pat. No. 4,313,124, which is an invention relating to the temperature rising ratio at the heat effecting surface are employed, a satisfactory print result can be obtained.

As an alternative to the structure (linear fluid passage or perpendicular fluid passage) of the print head disclosed in each of the aforesaid inventions and having an arrangement that discharge ports, fluid passages and electricity-to-heat converters are combined, a structure having an arrangement that the heat effecting surface is disposed in a bent region as disclosed in U.S. Pat. Nos. 4,558,333 or 4,459,600 may be employed. In addition, the following structures may be employed: a structure having an arrangement that a common slit is formed to serve as a discharge section of a plurality of electricity-to-heat converters as disclosed in Japanese Patent Laid-Open Application No. 59-123670; and a structure disclosed in Japanese Patent Laid-Open Application No. 59-138461 in which an opening for absorbing pressure waves of heat energy is disposed to correspond to the discharge section.

Furthermore, as a print head of the full line type having a length corresponding to the maximum width of a print medium which can be recorded by the printer apparatus, either the construction which satisfies its length by a combination of a plurality of print heads as disclosed in the above specifications or the construction as a single full line type print head which has integrally been formed can be used.

In addition, the invention is effective for a print head of the freely exchangeable chip type which enables electrical connection to the printer apparatus main body or supply of ink from the main device by being mounted onto the apparatus main body, or for the case by use of a print head of the cartridge type provided integrally on the print head itself.

It is preferred to additionally employ the-print head restoring means and the auxiliary means provided as the component of the present invention because the effect of the present invention can be further stablized. Specifically, it is preferable to employ a print head capping means, a cleaning means, a pressurizing or suction means, an electricity-to-heat converter, another heating element or a sub-heating means constituted by a combination thereof and to employ a sub-emitting mode in which an emitting is performed independently from the printing emitting in order to stably perform the printing operation.

The printer apparatus may be arranged to be capable of printing a color-combined image composed of different colors or a full color image obtained by mixing colors to each other by integrally forming the print head or by combining a plurality of print heads as well as printing only a main color such as black.

Although a fluid ink is employed in the aforesaid embodiment of the present invention, ink which is solidified at the room temperature or lower and as well as softened at the room temperature, ink in the form of a fluid at the room temperature, or an ink which is formed into a fluid when the print signal is supplied may be employed because the aforesaid ink-jet method is ordinarily arranged in such a manner that the temperature of ink is controlled in a range from 30° C. or higher to 70° C. or lower so as to make the viscosity of the ink to be included in a stable discharge range.

Furthermore, ink of the following types can be adapted to the present invention: ink which is liquified when heat energy is supplied in response to the print signal so as to be discharged in the form of fluid ink, the aforesaid ink being exemplified by ink, the temperature rise of which due to supply of the heat energy is positively prevented by utilizing the temperature rise as energy of state change from the solid state to the liquid state; and ink which is solidified when it is allowed to stand for the purpose of preventing the ink evaporation. Furthermore, ink which is first liquified when supplied with heat energy may be adapted to the present invention. In the aforesaid case, the ink may be of a type which is held as fluid or solid material in a recess of a porous sheet or a through hole at a position to face the electricity-to-heat converter as disclosed in Japanese Patent Laid-Open Application No. 54-56847 or Japanese Patent Laid-Open Application No. 60-71260. It is the most preferred way for the ink to be adopted to the aforesaid film boiling method.

In addition, the printer apparatus of the present invention may be used as an integrated or independent image output terminal of an information processing equipment such as a wordprocessor, a computer, or the like, may be combined with a reader or the like to constitute a copying machine, or may be applied to a facsimile apparatus having a transmission/reception function.

The present invention can be applied to a system constituted by a plurality of devices, or to an apparatus comprising a single device. Furthermore, the invention is applicable also to a case where the object of the invention is attained by supplying a program to a system or apparatus.

As described above, according to this embodiment, the following effects can be expected.

(1) Since most of electrical circuits in the printer apparatus used for printing are built in the heater board 100 of the print head, only a signal path needs to be provided so that information transferred from the host computer 30 is inputted into the print head. Thus, cost can be greatly reduced.

(2) Since the heater board 100 can employ a memory arrangement or system arrangement suited for the number of nozzles, high-speed data processing can be realized.

(3) Since most of electrical circuits in the printer apparatus used for printing are built in the heater board 100 of the print head, the number of circuits in the printer apparatus is reduced, and only a signal path needs to be provided so that information transferred from the host computer 30 is inputted into the print head. Furthermore, when the print control is adjusted in accordance with the detected temperature in the print head, the output of the temperature sensor does not have to be transferred to the circuit in the printer apparatus as the conventional printer. Thus, the constitution of the printer apparatus is simplified, and the size of the entire printer apparatus can be rendered compact.

(4) Since temperature input/output devices, light or magnetism-pressure input/output devices, driving elements for an external motor and the head, and the like are formed in a single process in the manufacture of the heater board, multi-functions can be realized, cost of the entire printer can be reduced, and high-speed processing of print data can be realized.

The present invention is not limited to the above embodiments and various changes and modification can be made within the spirit and scope of the present invention. Therefore, to apprise the public of the scope of the present invention, the following claims are made.

What is claimed is:

1. A print head mounted on a print apparatus for forming an image on a print medium, said head comprising:

print elements provided on a substrate for forming the image on the print medium;

print element driving means provided on the substrate for supplying signals corresponding to the image to said print elements and for driving said print elements;

transmission/reception means provided on the substrate for receiving signals and for transmitting signals to control mechanical portions of the print apparatus;

interface means provided on the substrate for receiving data to be used for printing from and transmitting data to an external apparatus connected to the print apparatus;

storage means provided on the substrate for storing the data received by said interface means; and control means provided on the substrate for processing the data stored in said storage means, for controlling the mechanical portions by transmitting a signal for controlling the mechanical portions via said transmission/reception means, for controlling said interface means, and for controlling said print element driving means in accordance with processed data.

2. The head according to claim 1, wherein said print element driving means, said control means and said transmission/reception means are formed on a single substrate.

3. The head according to claim 1, further comprising:

detection means provided on said substrate for detecting a temperature of said print head, wherein said control means controls said print element driving means in accordance with the temperature detected by said detection means.

4. The head according to claim 1, wherein said storage means further stores data used for controlling and a control program performed by said control means.

5. The head according to claim 1, wherein said control means comprises a processing device for processing control data for controlling formation of the image.

6. The head according to claim 1, wherein said print head comprises an ink-jet head having openings for discharging ink when said print elements are driven by said print element driving means.

7. The head according to claim 6, wherein said print elements comprise thermal energy converters for generating thermal energy, and said ink-jet head discharges the ink by applying the thermal energy to the ink.

8. The head according to claim 1, wherein said print elements comprise thermal energy converters for generating thermal energy in accordance with a supplied signal and said substrate comprises a device board having said thermal energy converters.

9. The head according to claim 1, wherein said print elements are formed on said substrate.

10. The head according to claim 9, wherein said print elements comprise thermal energy converters for generating thermal energy in accordance with supplied signals.

11. The head according to claim 10, wherein said print element driving means, said control means and said transmission/reception means are formed on said substrate.

12. A printer apparatus for forming an image on a print medium, said apparatus comprising:

mechanical portions; and a print head comprising print elements provided on a substrate of said print head for forming the image on the print medium, print element driving means provided on the substrate for supplying signals corresponding to the image to said print elements and for driving said print elements, transmission/reception means provided on the substrate for receiving signals and for transmitting signals to control said mechanical portions of said printer apparatus, interface means provided on the substrate for receiving data to be used for printing from and transmitting data to an external apparatus connected to said printer apparatus, storage means provided on the substrate for storing the data received by said interface means, and control means provided on the substrate for processing the data stored in said storage means and for controlling said mechanical portions by transmitting a signal for controlling said mechanical portions via said transmission/reception means, for controlling said interface means and for controlling said print element driving means in accordance with processed data.

13. The apparatus according to claim 12, wherein said print head comprises an ink-jet head having openings for discharging ink when said print elements are driven by said print element driving means.

14. The apparatus according to claim 12, wherein said print elements comprise thermal energy converters for generating thermal energy, and said ink-jet head discharges the ink by applying the thermal energy to the ink.

15. The apparatus according to claim 12, further comprising:

detection means provided on said substrate for detecting a temperature of said print head, wherein said control means controls said print element driving means in accordance with the temperature detected by said detection means.

16. The apparatus according to claim 12, wherein said print elements have thermal energy converters for generating thermal energy in accordance with a supplied signal and the substrate comprises a device board having said thermal energy converters.

17. The apparatus according to claim 16, wherein said print element driving means, said control means and said transmission/reception means are formed on said device board.

18. A print head mounted on a printing apparatus, for forming an image on a recording medium, the printing apparatus comprising a motor for scanning the print head over the recording medium to form the image, said head comprising:

interface means, connected to a host computer, for interfacing with the host computer which forwards image signals corresponding to an image; and controlling means for controlling driving of the motor and for driving print elements of the print head in accordance with the image signals received by said interface means.

19. The head according to claim 18, further comprising openings for discharging ink when said print elements are driven by print element driving means.

20. The head according to claim 19, wherein said print elements comprise thermal energy converters for generating thermal energy, and the ink is discharged by applying the thermal energy to the ink.

21. A substrate for an ink-jet print head, used in a recording apparatus, having a plurality of elements for ejecting ink and a driving circuit for driving the plurality of elements, comprising:

an interface for inputting and outputting data used for printing;

data processing means for processing the data for printing; and busses for transferring data to the driving circuit, wherein data transmitted from an external apparatus connected to the recording apparatus is directly inputted into the substrate via said interface.

22. A substrate according to claim 21, wherein said interface inputs or outputs any one of image data, image control data and correction data as the data for printing.

23. A substrate according to claim 21, further comprising a memory for storing the data for printing.

24. A substrate according to claim 23, wherein the memory comprises a RAM for storing the data for printing and reading out stored data.

25. A substrate according to claim 24, wherein the memory has an array of n×m (m is a natural number) bits in correspondence to the number n of the plurality of elements.

26. A substrate according to claim 25, wherein a number of signal lines of said busses connecting the memory with the driving circuit is n.

27. A substrate according to claim 23, wherein the driving circuit, the data processing means and the memory are connected via the busses.

28. A substrate according to claim 21, further comprising a ROM for storing data and for being accessed by said data processing means.

29. A substrate according to claim 28, wherein the ROM stores a control program implemented by said data processing means.

30. A substrate according to claim 28, wherein the driving circuit, the data processing means and the memory are connected via the busses.

31. A substrate according to claim 28, wherein the ROM is a mask ROM.

32. A substrate according to claim 28, wherein the ROM is an EEPROM.

33. A substrate according to claims 28, wherein the ROM is a one time ROM.

34. A substrate according to claim 21, wherein said data processing means comprises a CPU.

35. A substrate according to claims 21, wherein said busses include an address bus, a data bus and a control bus.

36. A substrate according to claim 21, further comprising:

a ROM for storing a control program;

a RAM for storing print data used for printing, wherein said data processing means processes the data stored in the RAM in accordance with the control program stored in ROM.

37. A substrate according to claim 36, wherein the data used for printing is transmitted to the driving circuit from the RAM via the busses by using said data processing means.

38. A substrate according to claim 36, wherein the data used for printing is directly transmitted to the driving circuit from the memory or the RAM via the busses without using said data processing means.

39. A substrate according to claim 21, wherein the data processing means decompresses compressed data received via said interface.

40. A substrate according to claim 21, further comprising an oscillation circuit for generating a clock signal.

41. A substrate according to claim 21, further comprising a timer circuit for counting time.

42. A substrate according to claim 41, wherein said data processing means controls a driving time period of the elements in accordance with the time counted by the timer circuit.

43. A substrate according to claim 21, further comprising drivers for driving an external unit provided externally of the substrate.

44. A substrate according to claim 21, further comprising input/output terminals for inputting signals from and outputting signals to outside of the substrate.

45. A substrate according to claim 44, further comprising an A/D converter for converting an analog signal into a digital signal, which is inputted via the input/output terminal.

46. A substrate according to claim 44, further comprising a D/A converter for converting a digital signal into an analog signal, which is transmitted via the busses.

47. A substrate according to claim 44, further comprising an operational element.

48. A substrate according to claim 21, further comprising a light emitting device and a light receiving device.

49. A substrate according to claim 48, further comprising means for controlling a print timing based on a detection of a printing position by said light emitting device and said light receiving device.

50. A substrate according to claim 21, further comprising a magnetic sensor.

51. A substrate according to claim 50, further comprising means for controlling a print timing based on a printing position by said magnetic sensor.

52. A substrate according to claim 21, further comprising a status detecting device for detecting a status of the substrate.

53. A substrate according to claim 52, wherein said status detecting device is a temperature sensing device.

54. A substrate according to claim 52, wherein said status detecting device is a pressure sensing device.

55. A substrate according to claim 52, wherein said data processing means controls in feed back based on a detecting result by the status detecting means.

56. A substrate according to claim 21, further comprising a detecting device for detecting electromagnetic waves.

57. A substrate according to claim 21, further comprising a magnetic generating device.

58. A substrate according to claim 21, further comprising a pressure generating device.

59. A substrate according to claim 21, further comprising a temperature generating device for generating temperature.

60. A substrate according to claim 21, further comprising heat generating devices for heating ink to be ejected onto a recording paper by the elements for ejecting ink.

61. A substrate according to claim 21, further comprising nozzles for forming ink passages in correspondence to the plurality of elements for ejecting ink.

62. A print head having a substrate according to claim 21.

63. A substrate for an ink-jet head, used in a recording apparatus, having a plurality of elements for ejecting ink and a driving circuit for driving the plurality of elements, comprising:

an interface for inputting and outputting print data;

detecting means for detecting a status of the substrate; and processing means for processing relating to the driving of the plurality of elements in accordance with the print data, based on a detection result of said detecting means;

wherein data transmitted from an external apparatus connected to the recording apparatus is directly inputted into said substrate via said interface.

64. A substrate according to claim 63, further comprising generation means for generating at least one of temperature, pressure and magnetism information, wherein said processing means controls said generation means based on a detecting result of said detecting means.

65. A substrate according to claim 63, wherein said processing means comprises a CPU.

66. A substrate according to claim 63, further comprising nozzles for forming ink passages in correspondence to the plurality of elements for ejecting ink.

67. A print head having a substrate according to claim 63.

68. A method for recording by driving a plurality of elements for ejecting ink, the plurality of elements being provided on a substrate of an ink-jet head mounted on a recording apparatus, comprising the steps of:

directly inputting data to be used for recording into the substrate from an external device connected to the recording apparatus;

processing the data inputted in said inputting step; and driving the plurality of elements based on the data processed in said processing step.

69. A method according to claim 68, wherein in said inputting step, the data is compressed data, and the compressed data is decompressed in said processing step.

70. A method according to claim 68, wherein in said processing step, the data is processed in accordance with a program stored in a ROM mounted an the substrate.

71. A method according to claim 68, wherein in said processing step, the data is processed by using a RAM mounted on the substrate as a work area.

72. A method according to claim 68, wherein the processing of the data includes arithmetic processing.

73. A method according to claim 68, wherein the data includes image data and said processing step effects image processing.

74. A method according to claim 68, further comprising the step of transmitting the data for driving the plurality of elements to a driving circuit mounted on the substrate under control of a CPU mounted on the substrate, wherein in said driving step, the driving circuit drives the plurality of elements in accordance with the transmitted data.

75. A method according to claim 68, further comprising the step of transmitting the data for driving the plurality of elements to a driving circuit from a ROM mounted on the substrate via busses, wherein in said driving step, the driving circuit drives the plurality of elements in accordance with the transmitted data.

76. A method according to claim 68, further comprising the step of transmitting the data for driving the plurality of elements to a driving circuit from a RAM mounted on the substrate via busses, wherein in said driving step, the driving circuit drives the plurality of elements in accordance with the transmitted data.

77. A method according to claim 68, further comprising the step of driving an external device or external elements connected to the substrate.

78. A method according to claim 77, wherein the external device or external elements include a motor.

79. A method according to claim 77, wherein the external device or external elements include a solenoid.

80. A method according to claim 77, wherein the external device or external elements include an external head.

81. A method according to claim 68, further comprising the step of detecting a status of the substrate by using a detecting element.

82. A method according to claim 81, wherein the status of the substrate includes temperature.

83. A method according to claim 81, wherein the status of the substrate includes pressure.

84. A method according to claim 81, further comprising the step of feeding back the status of the substrate for processing in said processing step.

85. A method according to claim 68, further comprising the steps of:

detecting a printing position; and printing based on the printing position.

86. A method for recording by driving a plurality of elements for ejecting ink, the plurality of elements being provided on a substrate of an ink-jet head mounted on a recording apparatus, comprising the steps of:

directly receiving data to be used for printing from an external device connected to the recording apparatus and inputting the data to the substrate;

detecting a status of the substrate;

processing the data received in said receiving step based on the status of the substrate; and driving the plurality of elements based on the data processed in said processing step, wherein in said processing step, the data is processed by a CPU provided on the substrate.

87. A method according to claim 86, wherein the status of the substrate includes temperature or pressure.

88. A method according to claim 86, wherein said processing step processes relating to a generation of at least one of temperature, pressure and magnetic information based on the status of the substrate.

89. A print head mounted on a recording apparatus, comprising:

a substrate having a plurality of print elements for ejecting ink to form pixels on a print medium, a driving circuit for driving the plurality of print elements, an interface for inputting and outputting print data, and processing means for processing relating to the driving of the plurality of elements in accordance with the print data;

control means for outputting a control signal to control at least a printer apparatus main body;

print element driving means for driving said print elements in accordance with print data under control of said control means;

communication means for communicating data with an external apparatus under the control of said control means; and driving means for driving a part of a mechanism of the printer apparatus main body in accordance with a control signal from said control means, wherein said control means processes data directly inputted into said substrate via said interface from the external apparatus connected to the recording apparatus via said interface.

90. A print head according to claim 89, wherein said print element driving means, said print elements, said control means, said communication means, and said driving means are formed on a single substrate.

91. A print head according to claim 89, further comprising detection means for detecting a status of said print head.

92. A print head according to claim 89, further comprising storage means for storing print data, control data; and a program to be executed by said control means.

93. A print head according to claim 92, wherein said control means is arranged to control formation of the pixels based on print data, control data, and an output from said detection means.

94. A print head according to claim 89, wherein said control means comprises a CPU for processing control data for controlling formation of the pixels.

95. A print head according to claim 89, wherein said print elements comprise ink-jet printing elements for performing printing by discharging an ink onto the print medium.

96. A print head according to claim 95, wherein said ink-jet printing elements discharge the ink by utilizing thermal energy, and comprise thermal energy converters for generating thermal energy to be applied to the ink.

97. A print head according to claim 90, wherein said substrate comprises a heater board.

98. A printer apparatus for printing an image on a print medium comprising at least one print head, as claimed in claim 89, for printing an image on the print medium; a mounting unit for mounting the print head; and a mechanism for driving the mounting unit.

99. A printer according to claim 98, wherein said mechanism is driven by a control signal output from said control means of said print head.

* * * * *

UNITED STATES PATENT AND TRADEMARK OFFICE

CERTIFICATE OF CORRECTION

PATENT NO. : 6,243,109 B1
DATED : June 5, 2001
INVENTOR(S) : Ishinaga et al.

It is certified that error appears in the above-identified patent and that said Letters Patent is hereby corrected as shown below:

Title page,
Item [56], References Cited, “Hosington et al.” should read -- Hoisington et al. --.

Drawings,
Sheet 5, Figure 5, “HOST COMPUER” should read -- HOST COMPUTER --.
Sheet 6, Figure 6, “HOST COMPUER” should read -- HOST COMPUTER --.
Sheet 7, Figure 7, “HOST COMPUER” should read -- HOST COMPUTER --.

Column 11,
Line 56, “nal.” should read -- nals. --.

Column 12,
Line 39, “means;” should read -- means, --.

Column 14,
Line 42, “claim 92,” should read -- claim 91, --.

Signed and Sealed this

Fourth Day of February, 2003

JAMES E. ROGAN
*Director of the United States Patent and Trademark Office*